United States Patent
Bichot et al.

(10) Patent No.: US 10,034,048 B2
(45) Date of Patent: Jul. 24, 2018

(54) MULTIPATH DELIVERY FOR ADAPTIVE STREAMING

(75) Inventors: Guillaume Bichot, La Chapelle Chaussee (FR); Stephane Gouache, Cesson Sevigne (FR)

(73) Assignee: THOMSON LICENSING DTV, Issy-les-Mouineaux (FR)

( * ) Notice: Subject to any disclaimer, the term of this patent is extended or adjusted under 35 U.S.C. 154(b) by 333 days.

(21) Appl. No.: 13/577,954

(22) PCT Filed: Feb. 16, 2011

(86) PCT No.: PCT/EP2011/052286
§ 371 (c)(1),
(2), (4) Date: Aug. 9, 2012

(87) PCT Pub. No.: WO2011/101371
PCT Pub. Date: Aug. 25, 2011

(65) Prior Publication Data
US 2012/0311174 A1    Dec. 6, 2012

(30) Foreign Application Priority Data

Feb. 19, 2010  (EP) .................................... 10154153

(51) Int. Cl.
*G06F 15/16*       (2006.01)
*H04N 21/442*      (2011.01)
(Continued)

(52) U.S. Cl.
CPC ... *H04N 21/44209* (2013.01); *H04L 65/4084* (2013.01); *H04L 65/4092* (2013.01);
(Continued)

(58) Field of Classification Search
None
See application file for complete search history.

(56) References Cited

U.S. PATENT DOCUMENTS

| 5,928,331 A | 7/1999 | Bushmitch |
| 6,014,694 A | 1/2000 | Aharoni et al. |

(Continued)

FOREIGN PATENT DOCUMENTS

| EP | 1376952 | 1/2004 |
| EP | 1533981 | 6/2005 |

(Continued)

OTHER PUBLICATIONS

Thinh Nguyen et al., multiple Sender Distributed Video Streaming, Apr. 2004, IEEE Transavtions on Multimedia, vol. 6, No. 2.*

(Continued)

*Primary Examiner* — Younes Naji
*Assistant Examiner* — Da T Ton
(74) *Attorney, Agent, or Firm* — Meagher Emanuel Laks Goldberg & Liao, LLP

(57) ABSTRACT

A method and apparatus for delivering content via adaptive streaming technique over multiple communication paths between a client and a server are described. The method includes measuring a first, and respectively a second, available bit rate on the first, and respectively second, path, determining a requested bit rate from the measured first and second available bit rates, sending a first request via the first path for receiving a first part of the chunk of content identified by the time index i and by the requested bit rate and a second request via the second path for receiving a second part of the chunk of content, the first and second chunks of content being complementary, the size of each of the chunks being computed from the available bit rate and receiving the requested first, and respectively second, part via the first, and respectively second, path.

12 Claims, 4 Drawing Sheets

(51) Int. Cl.
H04N 21/462 (2011.01)
H04N 21/63 (2011.01)
H04L 29/06 (2006.01)

(52) U.S. Cl.
CPC ............ H04L 65/607 (2013.01); H04L 65/80 (2013.01); H04L 69/14 (2013.01); H04N 21/4621 (2013.01); H04N 21/4622 (2013.01); H04N 21/631 (2013.01)

(56) References Cited

U.S. PATENT DOCUMENTS

| | | | |
|---|---|---|---|
| 7,941,554 B2* | 5/2011 | Grigorovitch | H04N 7/163 709/219 |
| 8,169,916 B1* | 5/2012 | Pai | H04N 21/2181 370/236 |
| 8,812,735 B2 | 8/2014 | Igarashi | |
| 2003/0172331 A1 | 9/2003 | Cherian et al. | |
| 2005/0076136 A1* | 4/2005 | Cho | H04L 29/06027 709/231 |
| 2005/0188073 A1 | 8/2005 | Nakamichi et al. | |
| 2007/0143497 A1 | 6/2007 | Kottomtharayil et al. | |
| 2008/0080473 A1 | 4/2008 | Thubert et al. | |
| 2008/0082551 A1 | 4/2008 | Farber et al. | |
| 2008/0189429 A1* | 8/2008 | DaCosta | H04L 29/06027 709/231 |
| 2009/0043906 A1* | 2/2009 | Hurst | H04N 21/23439 709/231 |
| 2009/0185619 A1 | 7/2009 | Taleb et al. | |
| 2010/0011117 A1 | 1/2010 | Hristodorescu et al. | |
| 2011/0225302 A1* | 9/2011 | Park et al. | 709/227 |

FOREIGN PATENT DOCUMENTS

| | | | |
|---|---|---|---|
| JP | 2004088746 | | 3/2004 |
| JP | 2004289627 | | 10/2004 |
| JP | 2006244054 | | 9/2006 |
| JP | 2007036666 | | 2/2007 |
| JP | 2007535881 A | | 12/2007 |
| JP | 2011087103 | | 4/2011 |
| WO | 2005109224 A2 | | 11/2005 |
| WO | WO 2005/122532 A1 * | 12/2005 | ............ H04L 29/08 |
| WO | WO0920552 | | 12/2009 |

OTHER PUBLICATIONS

Thinh Nguyen et al., Multiple Sender Distributed Video Streaming, Apr. 2004, IEEE Transactions on Multimedia, vol. 6, No. 2.*

Natarajan et al, Computer communications"Concurrent multipath transfer during path failure", Cisco Syst, Univ Delaware, CIS Dept, pp. 1577-1587, Sep. 15, 2009.

Zhengye et al, "LayerP2P: Using layered video chunks in P2P live streaming", IEEE transactions on multimedia, vol. 11, n°7, Nov. 7, 2009.

Chang et al, "Improved min-cost flow scheduler for mesh-based P2P streaming system", IEEE, Proceedings 2009 IEEE International Conference on Multimedia and Expo (ICME), Commun. & Multimedia Lab., Nat. Taiwan Univ., Taipei, Jun. 28-Jul. 3, 2009.

Huszak et al, "Content-aware interface selection method for multipath video streaming in best-effort networks", IEEE, May 25-27, 2009, 16th International Conference on Telecommunications (ICT).

Firooz et al "IPROMISE reliable multi-sender algorithm for peer-to-peer networks", Jan. 7-12, 2007, Proceedings of the 2007 2nd International Conference on Communication System Software, Middleware and Workshops.

Hiromori et al, "A selection technique for replicated multicast video servers", 2002 International Conference On Parallel Processing, Proceeding, pp. 556-563.

Chen et al, "An intelligent parallel and scalable server I/O networking environment for high performance cluster computing systems", Jul. 14-17, 2008, Proceedings of the 2008 International Conference on Parallel and Distributed Processing Techniques and Applications (PDPTA 2008).

Ford et al., "HHTP Extensions for Simultaneous Download from Multiple Mirrors; draft-ford-http-multi-server-00.txt", Internet Engineering Task Force (IETF) Standard Working Draft, Internet Society (ISOC), Geneva, CH, Jul. 6, 2009, pp. 1-12.

Baldini et al., "Increasing Performances of TCP Data Transfers Through Multiple Parallel Connections", 2009 IEEE Symposium on Computers and Communications, Jul. 5, 2009, pp. 630-636. IEEE, US.

Pantos et al., "HTTP Live Streaming; draft-pantos-http-live-streaming-02.txt", Internet Engineering Task Force (IETF) Standard Working Draft, Internet Society (ISOC), Geneva, CH, No. 2, Oct. 5, 2009, pp. 1-20.

Qualcomm Europe S.A.R.L., "HTTP Streaming: Draft Specification for Static HTTP", Nov. 9-13, 2009, Doc.: S4-090816, pp. 1-14, 3GPP TSG-SA4 #56, Sophia-Antipolis, FR.

Research in Motion UK Ltd., "XML Schema for Media Format Description in the case of Client Controlled HTTP Streaming", Doc: S4-090872, pp. 1-3, Nov. 9-13, 2009, 3GPP TSG-SA4 #56, Sophia-Antipolis, FR.

Taleb et al., "Multi-Source Streaming in Next Generation Mobile Communication Systems," 2008 IEEE International Conference on Communications (ICC '08), IEEE US, May 19, 2008, pp. 296-300.

Nguyen et al., "Multiple Sender Distributed Video Streaming", 2004 IEEE Transactions on Multimedia, vol. 6, No. 2, Apr. 1, 2004, pp. 315-326, IEEE US.

Search Report dated Apr. 28, 2011.

* cited by examiner

MULTIPATH DELIVERY FOR ADAPTIVE STREAMING

This application claims the benefit, under 35 U.S.C. § 365 of International Application PCT/EP2011/052286, filed Feb. 16, 2011, which was published in accordance with PCT Article 21(2) on Aug. 25, 2011 in English and which claims the benefit of European patent application No. 10154153.0, filed Feb. 19, 2010.

FIELD OF THE INVENTION

The present invention relates generally to adaptive streaming and in particular to a method for delivering content via adaptive streaming technique over multiple communication paths and a device implementing the method.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Media delivery streaming solutions are mainly based on protocols such as Real time streaming Protocol (RTSP) as defined in the IETF RFC 2326, Microsoft Media Server (MMS) proprietary protocol from Microsoft or Real Time Messaging Protocol (RTMP) proprietary protocol from Adobe Systems.

More recently a streaming technique, that is adaptive and based on HTTP protocol, has emerged with different flavors such as the "Move Adaptive Stream" from Move Networks, the "HTTP Live Streaming" from Apple Inc. and the "IIS (Internet Information Services) Smooth Streaming" from Microsoft. The benefit of using the HTTP protocol in these streaming solutions is its capability to cross over NATs and firewalls seamlessly. The HTTP adaptive streaming technology provides a way to compensate for erratic network behavior regarding available bandwidth by continuously and gracefully upgrading or downgrading the video quality in order to fit with the bandwidth constraint.

In more detail-, WO 2005/109224 A2 from Move Networks describes a mechanism in an Agent Controller Module hosted in the client side and able to adapt to the fluctuant network bandwidth thanks to the fact that the media to stream is previously organized in a plurality of streamlets, also called chunks, each of them being encoded from low to high bitrates. According to the available network bandwidth and some other additional information a monitoring tool incorporated in the Agent Controller Module uses the HTTP protocol to request the server to send the best suited chunk to be streamed over a TCP/IP connection. On an elementary chunk basis the quality is up-shifted or down-shifted according to the Agent Controller Module.

WO 2009/020552 A1 from Move Networks discloses a system in which a client carries out a "parallel retrieval" method of more than one streamlet or part or streamlet at one time using multiple connections between the client and a single server.

The IIS Smooth Streaming Technical Overview, from Alex Zambelli, Microsoft Corporation, March 2009, describes the IIS Smooth Streaming Technique based on HTTP protocol over TCP/IP connection. The media to be streamed by the Server is previously chopped into chunks representing for example one to ten seconds duration. Then these chunks are encoded according to the H.264/MPEG-4 AVC standard at different bitrates and stored within a MP4 file format container. The mechanism selecting the bit rate according to the network bandwidth fluctuation and requesting seamlessly the corresponding chunks from the server is entirely implemented in the client side through an application code, the Silverlight application. The HTTP Live Streaming supports dynamic switching between streams of different data rates in response to changing connection speeds.

Apple Inc. submitted an Internet Draft to IETF in October 2009 on an HTTP streaming method specification entitled "HTTP Live Streaming draft-pantos-http-live-streaming-02". The HTTP streaming architecture of Apple, Inc. is based on 3 pillars: a Server, a Distribution, through a Web server or a Web caching system, and a Client. The media to be streamed is a video encoded in H.264 and an audio encoded in AAC. At a server, media to be streamed is encapsulated in MPEG-TS containers and fragmented into chunks of equal duration with a specific tool named Apple stream segmenter. This tool generates the chunks that are saved into *.ts files and an index file *.m3u8 constituting the chunks playlist. Then a client fetches the index file first thanks to an URL pointer. The index file, in turn, specifies the location of the available media files, decryption keys, and any alternate streams available. For the selected stream, the client downloads each available media file in sequence.

HTTP adaptive streaming methods are generally oriented to adapting the media viewing experience of the end user according to network congestion. Indeed, as soon as the network bandwidth measured by the client device decreases, the latter requests chunks which are less restrictive with respect to network bandwidth requirement; the "low bandwidth chunks". Conversely when the congestion problems decrease, the client device requests chunks which are more restrictive with respect to network bandwidth requirement; the "high bandwidth chunks".

The FIG. 1a illustrates the main steps of adaptive streaming method according to prior art. FIG. 1a shows a video content has been (pre-) encoded into four versions (version A, version B, Version C and version D) with increasing supported bit rates implying progressive quality increase. The encoded video content is split into chunks that allow seamless switching from one bit rate to another. All the video chunks correspond to an identical fixed duration. These chunks are more or less big: thus requiring higher/lower bandwidth and providing better/lesser video quality, depending on the supported bit rates. All the versions of the content stored in the server CS1 (version A, version B, Version C and version D) are split into a fixed number of chunks, 14 chunks in the FIG. 1a.

On FIG. 1a, a first step of the method according to prior art is shown: a client device CD monitors the bit rate BR1 of a path P1 connecting the client device CD to the server CS1.

In a second step, the client device CD determines a requested bit rate RBR compliant with the measured bit rate BR1. For example the requested bit rate RBR is the largest of supported bit rates BRA, BRB, BRC, BRD which is also less than or equal to the measured bit rate BR1.

In a third step, the client device requests via the path P1 a chunk identified by a time index i (here 1<i<14) and the requested bit rate RBR.

In a fourth step, the client device CD receives still from the path P1-chunk i at the requested bit rate RBR from the server CS1.

The four steps are repeated each time a chunk is needed.

The FIG. 1b shows a temporal evolution of the bit rate for a method of adaptive streaming of the prior art as presented above.

The curve on FIG. 1b shows the monitored bit rate BR1. Below the curve, one represents the chunk which is downloaded from the server. A typical adaptive client will continuously monitor the available bitrate (or bandwidth) and select the requested bit rate which is less than or equal to the available bit rate BR1 for the next chunks to be retrieved. Of course, depending on the implementation and the environment (network technology, application) the strategy may be conservative—i.e. the client requests higher bit rate chunk only after a certain time ensuring smooth upgrade transition; the client requests lower bit rate chunk as soon as it detects a bandwidth decrease implying rapid downgrade transition)—or more aggressive. In FIG. 1b, there are 4 different bit rates depicted corresponding to the four versions of the encoded content.

With the adaptive streaming solutions explained above, the video stream that is acquired by the client CD chunk after chunk does not have a consistent quality with time. It is understood that the user experience may be damaged when the bandwidth goes down. The video never or rarely interrupts but the quality could be very poor. There is no other particular solution to preclude this situation other than reducing the quality of transferred content. Increasing the receiver buffer will avoid the dry effect wherein a chunk delivery takes more time than expected but will not do anything against temporary low bandwidth availability.

One of the goals of the present invention is to fight the temporary lack of bandwidth (or bit rate quick slowdown) by using at least two (independent) delivery paths both being controlled by the client. These delivery paths must present transmission characteristics as orthogonal as possible. This can be achieved having one client (e.g. a terminal) connected to a server via at least two different access networks (e.g. broadband xDSL and cellular 3G/LTE) or/and connected to a server connected to at least two similar access networks (possibly managed by two different internet service providers) or this can be realized by having one client connected to at least, two servers, each server being connected to a different access network. The latter may be easier to implement and we will focus on this implementation for the invention. In the rest of the document a server can be viewed as a physical box connected to a dedicated link/path or as a logical entity connected through a dedicated path/link as well.

It is understood that the invention applies when at least two links/paths. In case of one machine hosting logical servers, the machine must support multi homing (i.e. can be connected to more than one network interface, each having a dedicated—e.g. IP-network address).

Instead of having the chunk files stored on one server, they are stored on two servers accessible through two different communication paths (each server has its own network accesses and its own IP address).

When the client detects that the available bit rate is slowing down on one of the paths, it can download the next chunk, or the next part of the chunk, from the alternative server. This can be implemented through a failover algorithm (use one main path and use the alternative path when the main path is struggling), through a load sharing algorithm (use both paths concurrently: a chunk is delivered partly from one of the server and partly from the other server or even through a bandwidth limited algorithm (guarantying a minimum global bit rate, by a main path P1 and additional paths P2, P3 in case an additional bit rate is needed to fulfill the global bit rate objective).

SUMMARY OF THE INVENTION

The technical problem that the present invention intends to solve is to improve an adaptive streaming method for rendering the streaming it less sensitive to problems of caused by temporary low bandwidth availability over a communication path.

Thus, the present invention concerns according to a first aspect, a method for for providing—content to be rendered at a client device CD including at least a first and a second communication interface CI1, CI2, wherein the first and second communication interface CI1, CI2 having a communication address, the content being accessible to the client device CD via at least a first and a second server communication interface SI1, SI2 having a communication address, a first path P1 being identified by the communication address of the first communication interface CI1 and the address of the first server communication interface SI1, a second path P2 being identified by the communication address of the second communication interface CI2 and the address of the second server communication interface SI2, the content being available under at least two versions having an encoding quality corresponding to a supported bit rate BRA, BRB constraint, each of the at least two versions being temporally split into chunks corresponding to an identical rendered duration of the content, a chunk being identified by a time index i and by one of the supported bit rates BRA, BRB, the content being simultaneously accessible by the client device CD though the first and a second path P1, P2.

According to the invention the method comprises, at the client device CD, steps of:

S1 measuring a first available bit rate BR1 on the first path P1 and a second available bit rate BR2 on the second path P2;

S2 determining a requested bit rate RBR among the supported bit rates BRA, BRB from the measured first available bit rate BR1 and from the measured second available bit rate BR2;

S3 sending a first request via the first path P1 for receiving a first part of the chunk identified by the time index i and by the requested bit rate RBR and a second request via the second path P2 for receiving a second part of the chunk, the first and second part of the chunk being complementary;

S4 receiving the requested first part via the first path P1 and the requested second part via the second path P2.

Thus, the present invention concerns according to a second aspect, a client device CD for receiving a content to be rendered, the client device CD comprising at least a first and a second communication interface CI1, CI2, wherein the first and second communication interface CI1, CI2 each having a communication address, said content being accessible to the client device CD via at least a first and a second server communication interface SI1, SI2 each having a communication address, a first path P1 being identified by the communication address of the first communication interface CI1 and the address of the first server communication interface SI1, a second path P2 being identified by the communication address of the second communication interface CI2 and the address of the second server communication interface SI2, the content being available under at least two versions having an encoding quality corresponding to a supported bit rate BRA, BRB constraint, each of the at least two versions being temporally split into chunks corresponding to an identical duration of the content, a chunk being identified by a time index i and by the supported bit rate BRA, BRB, the content being simultaneously accessible by the client device CD though the first and the second path P1, P2.

According to the invention the client device CD comprises:

Means for measuring a first available bit rate BR1 on the first path P1 and a second available bit rate BR2 on the second path P2;

Means for determining a requested bit rate RBR among the supported bit rates BRA, BRB from the measured first available bit rate BR1 and the measured second available bit rate BR2;

Means for sending a first request via the first path P1 for receiving a first part of the chunk identified by the time index i and the requested bit rate RBR and a second request via the second path P2 for receiving a second part of the chunk, the first and second part of the chunk being complementary;

Means for receiving the requested first part via the first path P1 and the requested second part via the second path P2.

The invention proposes an enhancement of the adaptive streaming methods of the prior art based on the usage of more than one server either in switched way or in a concurrent way allowing:

a better overall quality an improved service robustness from the client's perspective;

an improved service scalability from the server's perspective in case the chunks are encoded according to SVC.

Another advantage of the invention resides in its compatibility with architectures of known streaming devices. A method according to the invention can be implemented between a server and a client according to prior art without any modification for the player receiving the stream to be played back.

BRIEF DESCRIPTION OF THE DRAWINGS

The invention will be better understood and illustrated by means of the following embodiments and execution examples, in no way limitative, with reference to the appended figures on which:

In FIG. 3b, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

Figure 1:
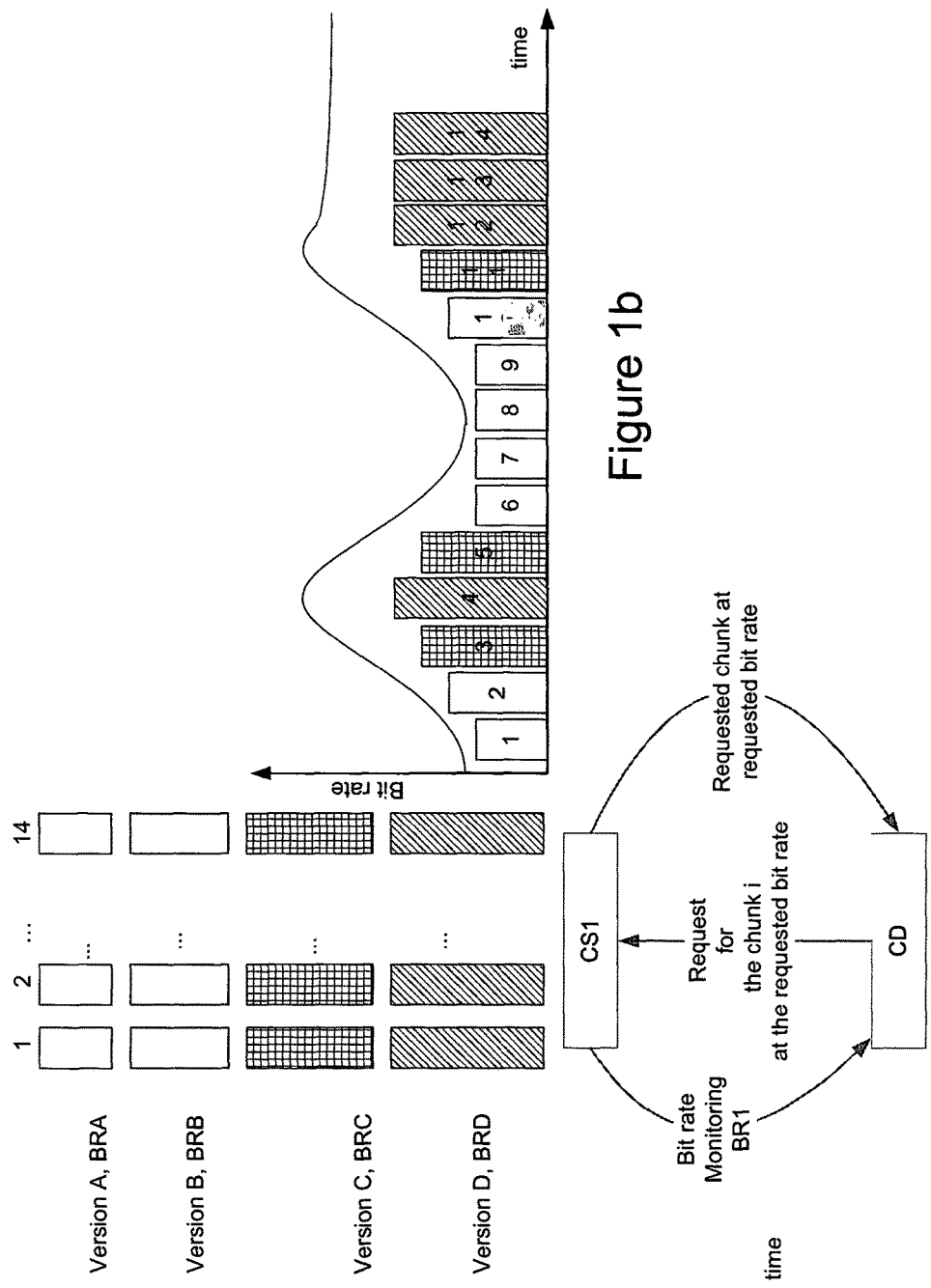
FIG. 1a, shows a client device CD requesting a content to a server using an adaptive streaming method according the prior art, already described above.
FIG. 1b, shows a temporal evolution of bit rate corresponding to an adaptive streaming method according the prior art, in regard with an evaluated bit rate, already described above.
Figure 2:
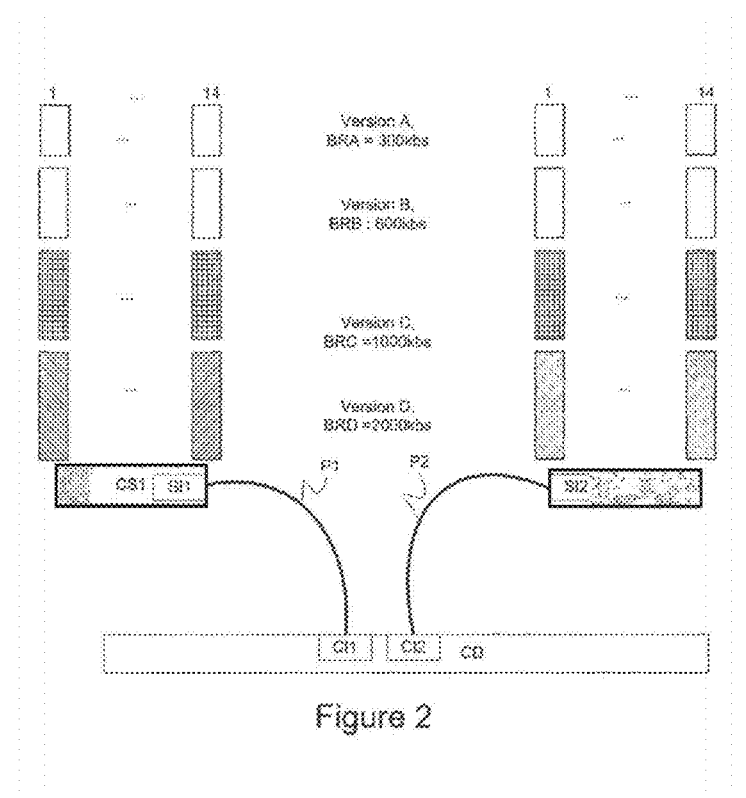
FIG. 2, shows an implementation of a multi paths adaptive streaming method according to the embodiment.

A multi paths adaptive streaming method for delivering a content to a client device CD according the embodiment is described in this section and illustrated with FIG. 2.

The client device according to the embodiment is represented in FIG. 2. The client device CD accesses content through a first and a second path P1, P2. The first path P1 is defined by a communication address of a first communication interface CI1 of the client device CD and a communication address of a first server communication interface SI1. Accordingly the second path P2 is defined by a communication address of a second communication interface CI2 of the client device CD and a communication address of a second server communication interface SI1.

Advantageously, a single server CS1 comprises the first and second communication interface SI1, SI2

Advantageously, the first and second communication interface CI1, CI2 are comprised in two different servers CS1, CS2. This situation will be illustrated in FIG. 2.

Advantageously, the servers CS1, CS2 are HTTP servers.

The client is also connected to a player 4 (not represented). On the server side, chunks are streamed upon the client request, using HTTP protocol over TCP/IP connection. The client requests parts of chunks according to an algorithm described hereinafter and based on path bit rate measurements. A chunk should have been fully received by the client before it is decoded and rendered. The client device CD is able to request content simultaneously through a first and a second communication interface CI1, CI2.

It is understood that the content can be downloaded through paths P1, P2. In the following one will depict a situation where the content is duplicated on different servers CS1, CS2: in other word the two server communication interfaces SI1, SI2 are located on two different servers CS1, CS2. The situation is similar if server communication interfaces SI1, SI2 are located on a single server CS1 where the content is stored: the only difference is the content is not duplicated on two different servers. This contributes to security by supplying a data redundancy.

The content is for example a video or audio content which is downloaded for being rendered at the client side. For example, once downloaded the client device CD transmits the content to a player (not represented on FIG. 2) chunk by chunk for being played back.

The content is for example generated by a content preparation tool. This tool generates compressed video and audio content (e.g. H264 and MP3 respectively) at at least two targeted (or supported) bit rates (e.g. BRA=300 kbps, BRB=600 kbps, BRC=1000 kbps, BRD=2000 kbps). The content preparation tool multiplexes them for producing a MPEG TS (Transport Stream) chunk series per supported bit rate.

All the chunks correspond to an identical duration of the content e.g. 2 seconds for each targeted bit rate. A chunk is identified for example by a time index i (1<i<14 in the example) and by one of the supported bit rates BRA, BRB, BRC, BRD.

On all the following figures, the chunks are represented as rectangular boxes: the horizontal size of the boxes are identical and corresponds to the above described identical duration. The vertical size of the rectangular boxes illustrates the quality of the chunk and corresponds to one of the supported bit rates BRA, BRB, BRC, BRD. Then, all the chunks belonging to a chunk series has an identical vertical size. But the size of the chunks belonging to a chunk series does not have necessarily identical sizes. The sizes of the chunks of a series identified by different time index depend on the time evolution of the content.

The chunk series are stored on both servers CS1, CS2 as represented in FIG. 2 and identified by "version A", "version B", "version C" and "version D". In the chosen representation, all the chunks stored on both servers CS1, CS2 are identical except the time index i.

The two servers CS1, CS2 are connected to the client device CD over two different access networks forming two independent paths (P1, P2).

At the connection set up, a manifest file is received by the client device CD from at least one of the servers CS1, CS2. This manifest file comprises a list of the supported bit rates BRA, BRB, BRC, BRD and for each supported bit rates BRA, BRB, BRC, BRD the list further comprises the total number of chunks, and the chunk size.

Advantageously, a list of alternative servers (or alternative server communications interface addresses) is proposed in the manifest file.

Figure 3B:
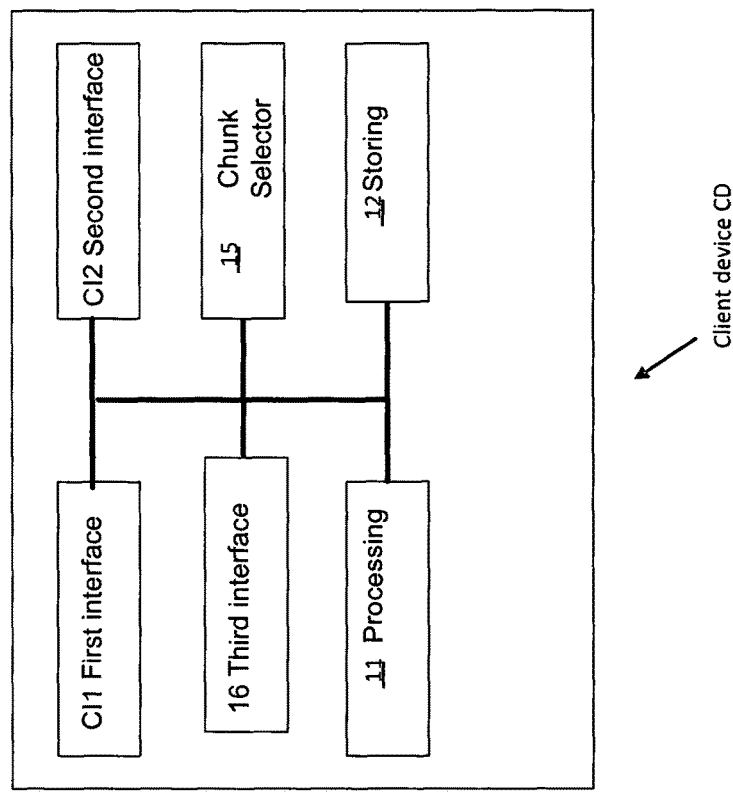
FIG. 3b, shows a temporal evolution of measured available bit rate for an adaptive streaming method according to the embodiment thus using a concurrent approach.
Figure 3A:
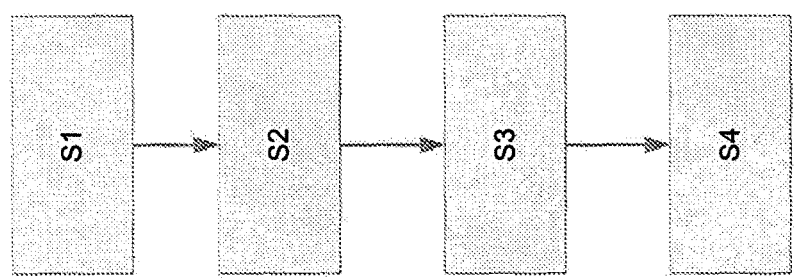
FIG. 3a is a block diagram of a client device according to the embodiment.

The FIG. 3a shows the four main steps of a method for providing a content to client device CD according to the embodiment.

In a first step S1, the client device CD monitors the available bit rate on the paths P1, P2: the available bit rate BR1 is measured continuously on the path P1 and the available bit rate BR2 is measured on the path P2.

Advantageously, the bit rates BR1, BR2 are measured periodically at a period lower or equal to the chunk duration: in the described example this period is 2 seconds.

Advantageously, the step S1 of measuring first and second available bit rates BR1, BR2 includes in computing a round trip time of a request sent by the client device CD through the first and second path P1, P2 and of an acknowledgment message sent by the server CS1, CS2 through the first and second path P1, P2 in response to the request.

In a second step S2, the client device CD determines a requested bit rate RBR among the supported bit rates BRA, BRB, BRC, BRD from the measure of the first and second bit rate BR1, BR2. The requested bit rate RBR is chosen exclusively from among the supported bit rates BRA, BRB, BRC, BRD as defined in the manifest file. The requested bit rate RBR defines the bit rate of the requested chunk.

Advantageously, the method comprises a further step of receiving by the client device CD a list of the supported bit rates BRA, BRB via at least one of the paths P1, P2 and further steps of for receiving for each supported bit rates BRA, BRB sizes of the chunks.

Advantageously, the client device CD further comprises means for receiving, via at least one of the first and second path P1, P2, information related to the supported bit rates BRA, BRB and for each supported bit rates BRA, BRB information related to the size of the chunks.

Advantageously, the step S2 of determining the requested bit rate RBR includes in selecting the largest bit rate among the supported bit rates BRA, BRB, BRC, BRD which is lower than or equal to the sum SUM of the measured first available bit rate BR1 and of the measured second available bit rate BR2 minus a provision.

Advantageously, the means for determining a requested bit rate RBR is adapted for evaluating a sum SUM of the measured first available bit rate BR1 and of the measured second available bit rate BR2 and the means is adapted for selecting the largest bit rate among the supported bit rates BRA, BRB which is lower than or equal to the sum SUM of the measured first available bit rate BR1 and of the measured second available bit rate BR2 minus a provision.

In a third step S3, the client device CD sends a request for a chunk identified by the time index i and the requested bit rate RBR to both servers CS1, CS2 via respectively paths P1 and P2. More particularly, the client device CD sends a request to the server CS1 via path P1 a first part of the chunk at the requested bit rate RBR and to the second server CS2 via path P2 a second part of the chunk, the first and second part of the chunk being complementary.

By using the term "complementary", one wishes to describe that there is no overlap between the first part and the second part and that the aggregation of both the first and second part result in the whole chunk.

The fourth step S4 consists in receiving by the client device CD concurrently the requested first part via the first path P1 and the requested second part via the second path P2. The paths P1, P2 are used concurrently for providing the chunk.

By using the term "concurrently" one wishes to highlight that both parallel paths P1, P2 are used simultaneously for downloading a single chunk or portion thereof in its entirety: no part of the chunk is downloaded by both paths P1, P2.

The client device CD according to the embodiment is illustrated in FIG. 3b. The client device CD comprises a first interface CI1 to a first network which comprises the protocol stacks for communicating with a first server communication interface of the server CS1 connected over the first network and a second interface C12 to a second network which comprises the protocol stacks to communicate with a second server communication interface of the server CS2 connected over second network. In particular the first and second networks are the Internet. Of course, the networks could be any other type of network enabling a client to communicate to a server.

The client device CD also comprises a third interface 16 to connect to a player that is adapted to decode and render the content. Of course, the third interface could enable connecting to more than one player. It could be an interface to a network enabling to connect one or more players. The client device CD also comprises a processor 11 for processing the applications stored in the client. It further comprises storing means 12, such as a memory, for buffering the chunks or the parts of the chunks received from the servers before they are transmitted to the player. In particular the memory is a volatile memory. Of course, the client comprises a non-volatile memory, not represented, for storing applications running on the client. The client could be implemented in a gateway device; the client device can be implemented as software or hardware.

The requested first part has a first size NB1, the requested second part comprising has a second size NB2.

Advantageously, a ratio between said first size NB1 and said second size (NB2) is equal to a ratio between the measured first available bit rate BR1 and the measured second available bit rate BR2.

Advantageously, the step S2 of determining the requested bit rate RBR comprises a step of evaluating a sum SUM of the measured first available bit rate BR1 and of the measured second available bit rate BR2 and the requested bit rate RBR is determined from the sum SUM.

Advantageously, the first size NB1 is proportional to a size of the chunk identified by the time index i and the requested bit rate RBR and a ratio between the measured first available bit rate BR1 and the sum SUM.

Of course, various implementations of the method according to the embodiment are available involving the client device CD requesting parts of chunks via parallel paths P1, P2, ..., Pn. The client device CD opens connections to n servers CS1, CS2, ..., CSn where a content is available under at least two versions corresponding to respectively two different supported bit rates BRA, BRB. The client device CD sends in parallel requests for non-overlapping parts of a chunk of content concurrently from these servers CS1, CS2, ..., CSn.

An advantage of the method is to spread the traffic load across the available servers CS1, CS2, ..., CSn. The load repartition is recomputed for every chunk. The load requested from each server CS1, CS2, ..., CSn is determined by the size of the chunk part requested from this server. The client device CD indicates the number of bytes it wishes to retrieve from each server by including a byte range header. This header has the following format:

Advantageously, the request sent by the client device is a HTTP request.

GET/path/example.jpg HTTP/1.1
Host: example.com
Range: bytes=0-999

In the above example, the request means that the client device requests for the first 1000 bytes of the specified resource "example.com". With each request/response with a server for a given range of a given chunk, the client device CD computes the current available bit rates BR1, BR2, ... BRn as follows:

$$BR1_i = nbytes_{SC1,i} 8 + time_{SC1,i}$$

Where nbytesCS1,i is the number of bytes requested from server CS1 at for the chunk with time index i (also name "iteration"") and timeCS1,i is the duration required to download the requested chunk part from server CS1 for the chunk having time index i.

This instantaneous available bit rate measurement can be used to feed a smoothing algorithm that guarantees both a progressive quality improvement and a quick response to severe network degradations. The smoothing algorithm gives an available bit rate estimate that can be used to request the next chunk.

$$E1,i = f(BR1,i, BR1,i-1, BR1,i-k)$$

In case, n servers are available, the total available bit rate for downloading the next chunk is:

$$SUM = \sum_{s=1,\ldots,n} E_{s,i}$$

Advantageously, the proposed method involves a further step SA not represented in FIG. 3a for determining whether the first and second available bit rates BR1, BR2 measured over the paths P1, P2 are larger than a threshold value BRTH1, wherein the four steps S1, S2, S3, S4 are carried out exclusively for paths P1, P2 over which the client device CD determines the measured available bit rates BR1, BR2 that are greater than the threshold value BRTH1.

In another embodiment, the concurrent mode of operation is performed just for reaching a target bit rate greater than or equal to a threshold BRTH2. A use case for this mode of operation would be to allow guarantying a given bit rate BRTH2 but not at any price by mobilizing all the available paths. In other words, to use a second server CS2 only if it is needed for reaching the requested bit rate BRTH2.

The content is downloaded chunk by chunk to the client device CD only from the single server CS1 via the path P1. The first available bit rate BR1 on the path P1 is measured by the client device CD. The four steps S1, S2, S3, S4 are carried out exclusively when the client CD determines that the available bit rate BR1 is less than a threshold BRTH2 and in that case the step S2 of determining the requested bit rate RBR includes selecting the largest bit rate from among the supported bit rates BRA, BRB which is lower than or equal to the threshold BRTH2 minus a provision.

The requested bit rate RBR of the next chunk to download is the largest supported bit rate (among the supported bitrates BRA, BRB, BRC, BRD as defined in the manifest file) lower than or equal to the total available bit rate BR1+BR2. The chunk size (expressed in bytes) can be approximated as:

$$size = RBR \cdot duration \div 8$$

With no minimum bit rate threshold, the number of bytes to download from the s-th server for the next iteration is directly proportional to the share of the s-th measure of available bit rate BR1 from the total bandwidth SUM.

$$nbytes_{s,i+1} = size \div E_{s,i} \div SUM$$

When a minimum bit rate threshold BRTH1 comes into play, one assigns a multiplicator ks to each server contribution, which allows disabling the servers whose bit rates are below the threshold. When the bit rate BRs corresponding to the path Ls between the client device CD and the server CSs is greater than or equal to the threshold then ks=1. When the bit rate BRs is lower than the threshold then ks=0. The total bit rate formula becomes:

$$SUM = \sum_{s=1\ldots n} k_s \cdot E_{s,i}$$

which is obviously lower than the total bit rate calculated without threshold. The number of bytes to download from the s-th server becomes:

$$nbytes_{s,i+1} = size \cdot k_s \cdot E_{s,i} \div SUM$$

These numbers of bytes are used to request the appropriate byte ranges from each server, so if there are n servers, the client requests Range [0; nbytes1-1] from the server CS1
Range [nbytes1; nbytes2-1] from the server CS2
Range [nbytes1+nbytes2; nbytes3-1] from the server CS3
Range $$\left[\sum_{i=1...k-1} nbytes_i;\right.$$

nbytesk-1] from the server CSk (k<n)
Range $$\left[\sum_{i=1...n-1} nbytes_i;\right.$$

endoffile] from the server CSn

The last range uses a special range end indication to cope with the fact that the chunks are often of unequal size. This way, the last range allows the client to retrieve the end of the chunk without knowing its exact size.

Upon reception of the byte ranges from all the servers, the client device CD simply concatenates the byte ranges in ascending order to reconstruct the entire chunk. This chunk is then consumed by the player module normally, as if it originated from a single server.

Advantageously, the four steps S1, S2, S3, S4 are carried out each time a chunk is downloaded from the servers CS1, CS2.

The method according to the embodiment is also adapted for overcoming drastic decrease of a bit rate over one of the paths.

Advantageously, the client device CD comprises means for determining whether the available bit rate over one of the paths P1, P2, P3 is less than a threshold value BRTH2, BRTH3.

The client device CD is adapted for example for determining whether a delivery duration of said requested part of the chunk i exceeds a threshold value DTH.

In consequence the client device CD may decide, during an iteration, to stop (or ignore) processing the end of an ongoing request (e.g. bytes range) and submit immediately a new request to a next server for getting the remaining bytes of the range to be completed. This next server is for example the server which is reachable with highest bit rate or a group of servers. In that case, the client sends a request for receiving the fragment of the part of the chunk which has not yet been received.

Let's illustrate the method using an example where the content is accessible to the client device CD via three independent paths P1, P2, P3, for example the content is duplicated on three servers CS1, CS2, CS3, the requested bit rate RBR is determined from a first, a second and a third available bit rate BR1, BR2, BR3 measured respectively on the first, second and third paths P1, P2, P3. The client device CD has requested a first part of the chunk identified by time index i and the requested bit rate RBR via the first path (P1), a second part of the chunk via the second path P2, a third part of the chunk via the third path P3.

The method according to the embodiment involves further steps of:

When the requested first and second part are completely received by the client device CD, a first fragment of the third part being received by the client device CD and when the client device CD has determined that the available bit rate BR3 over the path P3 is less than a threshold value BRTH3, S5 sending a request via the path P1 for receiving a first part of the third fragment of the third part of the chunk identified by the time index i and sending a request via the path P2 for receiving a second part of the third fragment of the third part of the chunk identified by the time index i via the path P2, said first and second part being complementary parts of the third part.

For the path P2 having a bit rate below a threshold BRTH3, the client requests a fragment of chunk (e.g. the current chunk). For example a fragment whose size is half the threshold BRTH3 multiplied by the chunk duration (e.g. 2s).

$$nbytes_{CS3,i+1} = \frac{(BRTH3 \div 8) \cdot duration}{2}$$

This fragment is only used to maintain an accurate bit rate evaluation for this particular path. The fragment is not passed to the player.

In a further embodiment, one adapts the algorithm to redistribute the load during the duration of a single chunk.

Figure 4A:
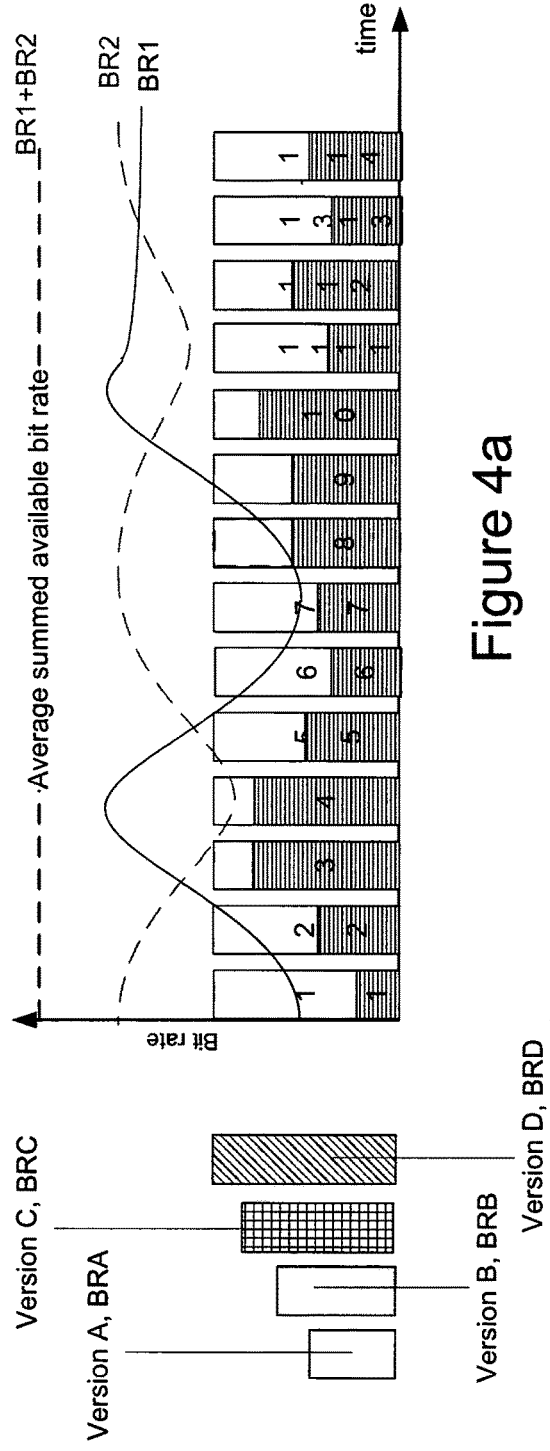
FIG. 4a, shows a temporal evolution of bit rate for an adaptive streaming method according the embodiment.

The temporal evolution of the measured bit rate BR1, BR2 corresponding to an embodiment evolving threshold value BRTH2 is shown on FIG. 4a.

A first curve (plain line) shows the temporal evolution of measured bit rate BR1 on a first path P1. A second curve (dashed line) shows the evolution of measured bit rate BR2 on a second path P2. A third curve (dashed bold line) shows the evolution of measured total bit rate BR1+BR2. Here it is constant.

This is an advantage in comparison with prior art presented above: even if there are some temporal fluctuation of measured bit rate on a single path, the fluctuation are averaged when considering the aggregated bit rate here BR1+BR2. Correlatively, the requested bit rate BRB is constant and then, the quality of the chunks received by the client device is constant even if there are bit rate fluctuations over the paths P1, P2.

On the same figure one sees that the first and second part of the chunk received by the client device CD respectively through path P1 and path P2: The horizontal striped boxes show the first parts of chunk received via the first path P1 and the plain boxes show the second parts of chunk received via the second path P2. Here the received chunks have all the same requested bit rate RBR because the aggregated bit rate here BR1+BR2 is constant. But, according to the relative fluctuation of measured bit rates BR1 and BR2 the relation between the size of the first part and the size of the second part varies temporally due to the temporal fluctuation of measured available bit rates.

Figure 4B:
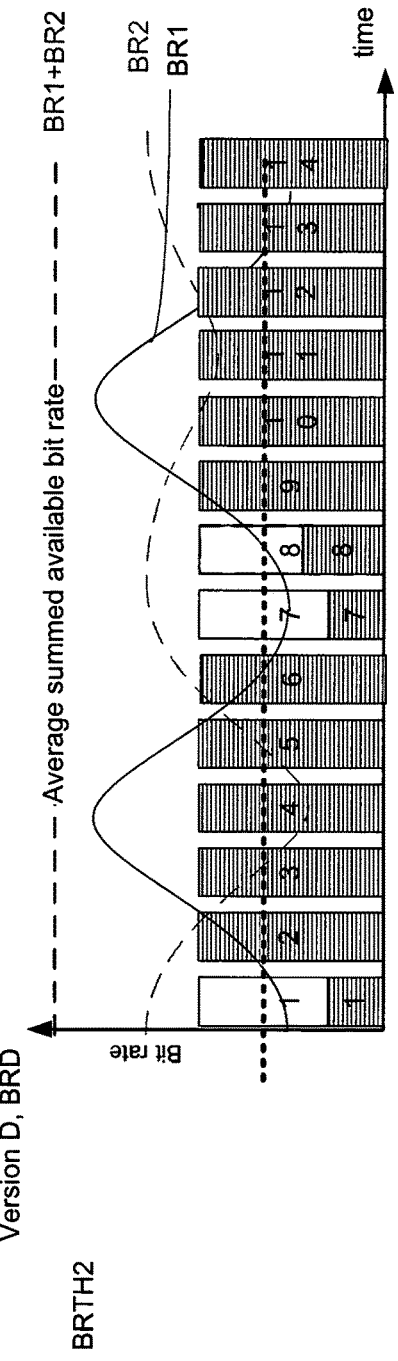
FIG. 4b, shows a temporal evolution of bit rate for an adaptive streaming method according the embodiment thus using a failover approach.

Starting with similar hypothesis on temporal evolutions of the measured bit rate, FIG. 4b shows the parts of chunks download through the first and second path P1, P2 when considering a threshold BRTH2.

The idea here is to implement a concurrent download only by specific conditions for example when the available bit rate BR1 measured on path P1 is lower than a threshold BRTH2. In normal operation, a download on a single server is implemented. This situation is shown on FIG. 4b where the client device CD requests and receives a chunk via a single path P1 only when the plain curve is lower than the threshold BRTH2.

Accordingly, as soon as the measured bit rate BR1 is lower than said threshold BRTH2, the client device measures a second available bit rate BR2 on the other path P1 and request parts of the chunk via both paths.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

The invention claimed is:

1. A method for providing a content to be rendered at a client device, said client device including at least a first communication interface having a first communication address, said content being accessible to the client device via at least first server and second server communication interfaces having second and third communication addresses respectively, a first path being identified by the first communication address of said first communication interface and by the second communication address of the first server communication interface, at least a second path being identified by the first communication address of said first communication interface and by the third communication address of the at least second server communication interface, said content being accessible to said client device via at least said first server and said second server communication interfaces, or said client device including at least said first communication interface and a fourth communication interface, wherein said fourth communication interfaces having a fourth communication address, said content being accessible to the client device via at least said first server communication interface having said second communication address, a third path being identified by the first communication address of said first communication interface and by the second communication address of said first server communication interface, at least a fourth path being identified by the fourth communication address of said fourth communication interface and by the second communication address of the at least first server communication interface, said content being available under at least two versions having an encoding quality corresponding to a supported bit rate constraint, each of said at least two versions being temporally split into chunks corresponding to an identical rendered duration of the content, a chunk being identified by a time index i and by one of the supported bit rates, said content being simultaneously accessible by said client device though said first and said at least second path or said third path and said at least fourth path, wherein the method comprises, at the client device:

determining a first available bit rate on the first path and at least a second available bit rate on the at least second path or determining said first available bit rate on the third path and at least a second available bit rate on the at least fourth path;

receiving by the client device a list of the supported bit rates via at least one of the paths and further receiving for each supported bit rates sizes of the chunks;

determining a requested bit rate from among the supported bit rates from the determined first available bit rate and from the at least determined second available bit rate;

sending a first request via the first path or the third path for receiving a first part of the chunk identified by the time index i and the determined requested bit rate and sending at least a second request via the at least second path or the at least fourth path for receiving at least a second part of said identified chunk, said first part and at least a second part of the chunk being complementary, each of said first and at least a second part of the chunk having a size being computed from the determined first available bit rate and from the at least determined second available bit rate, the requested first part having a first size, the requested second part having a second size, a ratio between said first size and said second size being equal to a ratio between the determined first available bit rate and the at least determined second available bit rate;

receiving the requested first part via the first path or the third path and the at least requested second part via the at least second path or the at least fourth path.

2. The method according to claim 1, wherein the determining the requested bit rate comprises evaluating a sum of the determined first available bit rate and of the at least determined second available bit rate and the requested bit rate is determined from the sum.

3. The method according to claim 2, wherein the determining the requested bit rate consists of selecting a largest bit rate among the supported bit rates which is lower than or equal to the sum of the determined first available bit rate and of the at least determined second available bit rate minus a provision.

4. The method according to claim 1, wherein a first threshold value for a targeted requested bit rate is determined and wherein the determining the requested bit rate consists of selecting a largest bit rate among the supported bit rates which is lower than or equal to the first threshold value minus a provision.

5. The method according to claim 2, wherein, the requested first part has a first size, said first size is proportional to a size of the chunk identified by the time index i and the determined requested bit rate and a ratio between the determined first available bit rate and the sum.

6. The method according to claim 1, wherein the determining the first and the at least second available bit rates, the receiving the list of the supported bit rates, the determining the requested bit rate, the sending the first and second requests for receiving the first part and the second part of the chunk and the receiving the requested first part and the at least the requested second part of the chunk are carried out each time said chunk is completely received by the client device.

7. The method according to claim 1, wherein the method further comprises determining whether the first and at least second available bit rates determined over the paths are larger than a second threshold value.

8. The method according to claim 1, wherein the determining said first and second available bit rates consists of computing a round trip time of one of said first request and said second request sent by the client device through said first and at least second path and of an acknowledgment message sent in response to said first and second requests through said at least first and second path.

9. The method according to claim 1, said client device further comprising a fifth communication interface having a fifth communication address, said content being accessible to the client device via a third server communication interface having a sixth communication address, a fifth path being identified by the fifth communication address of said fifth communication interface and by the sixth communication address of the third server communication interface, the requested bit rate being determined from said first, said second and a third available bit rates determining respectively on said first or third paths, on said second or fourth paths and on said fifth path, the client device having requested said first part of the chunk identified by the time index i and the requested bit rate via the first path or the third path, said second part of said chunk via the second path or the fourth path, a third part of said chunk via the fifth path, said content being simultaneously accessible by said client device through said first path or said third path, on said second path or said fourth path, and on said fifth path, wherein the method involves, at said client device:

a. when the requested first and second parts of said chunk are completely received by said client device, a first fragment of the third part being received by the client device, a second fragment of the third part being complementary to said first fragment, and when the client device has determined that the available bit rate over the fifth path is less than a third threshold value, sending a request via the first path or the third path for receiving a first complementary part of said second fragment and sending a request via the second path or the fourth path for receiving a second complementary part of the said second fragment, said first and second complementary parts having no overlap and aggregation of both said first and second complementary parts resulting in the whole second fragment.

10. A client device for receiving a content to be rendered, said client device comprising one or more processors, at least a first communication interface having a first communication address, said content being accessible to the client device via at least a first server and a second server communication interfaces having second and third communication addresses respectively, a first path being identified by the first communication address of said first communication interface and by the second communication address of the first server communication interface, at least a second path being identified by the first communication address of said first communication interface and by the third communication address of the at least second server communication interface, said content being accessible to said client device via at least said first server and said second server communication interfaces, or said client device including at least said first communication interface and a fourth communication interface, wherein said fourth communication interface having a fourth communication address, said content being accessible to the client device via at least said first server communication interface having said second communication address, a third path being identified by the first communication address of said first communication interface and by the second communication address of said first server communication interface, at least a fourth path being identified by the fourth communication address of said fourth communication interface and by the second communication address of the at least first server communication interface, said content being available under at least two versions having an encoding quality corresponding to a supported bit rate constraint, each of said at least two versions being temporally split into chunks corresponding to an identical duration of the content, a chunk being identified by a time index i and by the supported bit rate, said content being simultaneously accessible by said client device though said first and a said at least second path or said third path and said at least fourth path, and wherein the one or more processors of said client device is adapted to:

determine a first available bit rate on the first path and at least a second available bit rate on the at least second path or determining said first available bit rate on the third path and at least a second available bit rate on the at least fourth path;

receive by the client device a list of the supported bit rates via at least one of the paths and further receiving for each supported bit rates sizes of the chunks;

determine a requested bit rate from among the supported bit rates from the determined first available bit rate and from the at least determined second available bit rate;

send a first request via the first path or the third path for receiving a first part of the chunk identified by the time index i and the determined requested bit rate and sending at least a second request via the at least second path or the at least fourth path for receiving at least a second part of said identified chunk, said first part and at least a second part of the chunk being complementary, each of said first and at least a second part of the chunk having a size being computed from the determined first available bit rate and from the at least determined second available bit rate, the requested first part having a first size, the requested second part having a second size, a ratio between said first size and said second size being equal to a ratio between the determined first available bit rate and the at least determined second available bit rate;

receive the requested first part via the first path or the third path and the at least requested second part via the at least second path or the at least fourth path.

11. The client device according to claim 10, wherein the one or more processors is adapted for evaluating a sum of the determined first available bit rate and of the determined second available bit rate and for selecting a largest bit rate among the supported bit rates which is lower than or equal to the sum of the determined first available bit rate and of the determined second available bit rate minus a provision.

12. The client device according to claim 10, wherein the one or more processors is adapted to determine whether the determined first and the at least second available bit rates exceed a first threshold and to send the request for receiving said first part and said at least a second part of the chunks exclusively for paths over which the one or more processors determines the determined first and the at least second available bit rates are greater than the first threshold value.

* * * * *